No. 777,551. PATENTED DEC. 13, 1904.
A. S. SEVILLE.
MUSIC SCALE.
APPLICATION FILED JAN. 22, 1903.
NO MODEL. 2 SHEETS—SHEET 2.
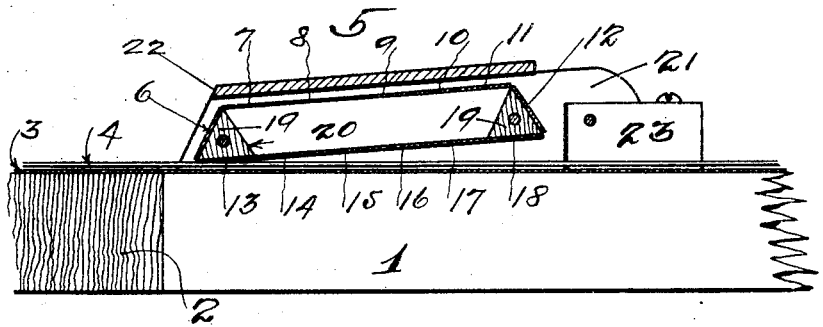

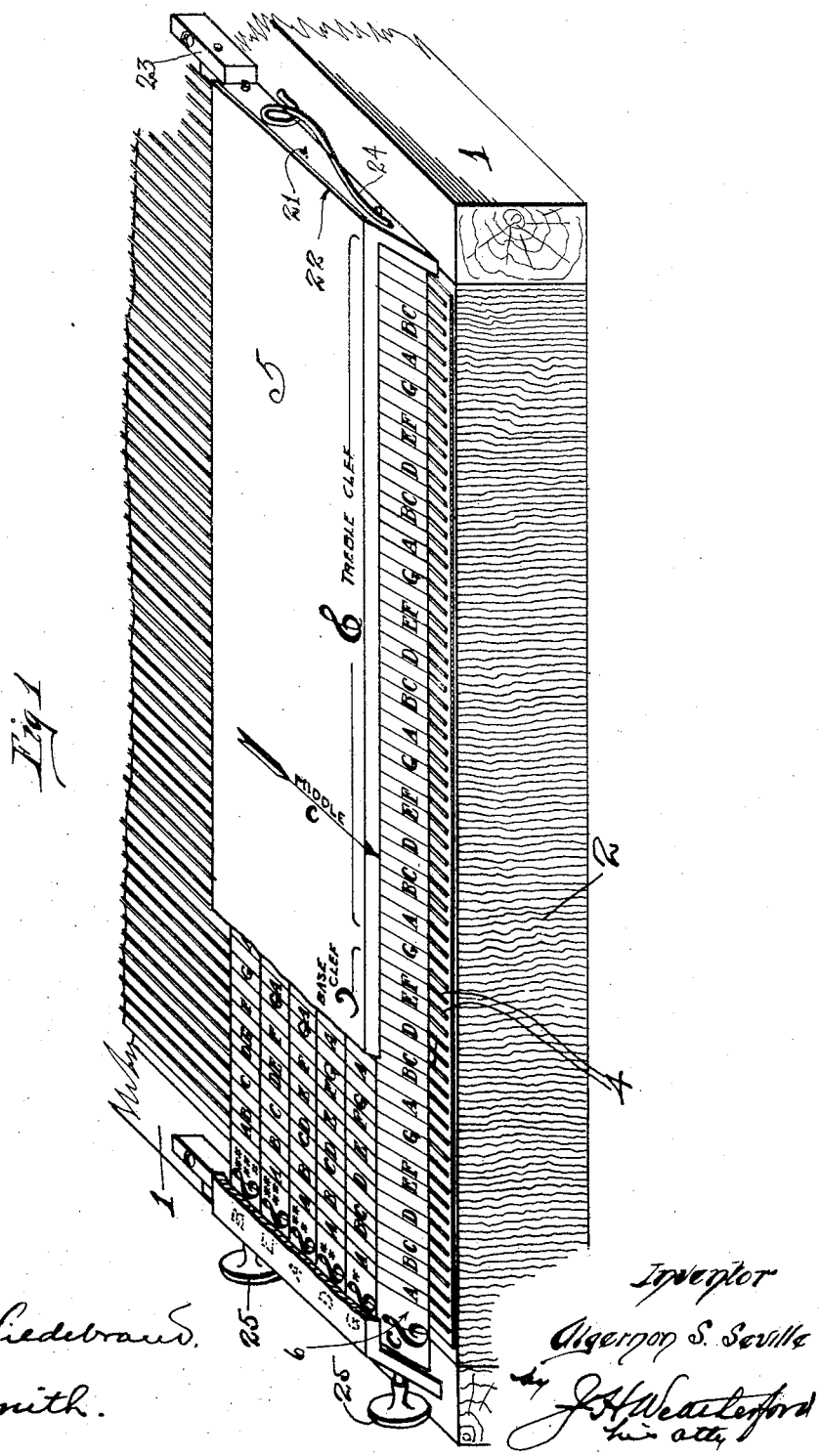

No. 777,551.                                              Patented December 13, 1904.

UNITED STATES PATENT OFFICE.

ALGERNON S. SEVILLE, OF MEMPHIS, TENNESSEE.

MUSIC-SCALE.

SPECIFICATION forming part of Letters Patent No. 777,551, dated December 13, 1904.

Application filed January 22, 1903. Serial No. 140,150. (No model.)

*To all whom it may concern:*

Be it known that I, ALGERNON S. SEVILLE, a citizen of the United States, residing at Memphis, Shelby county, State of Tennessee, have invented certain new and useful Improvements in Music-Scales, of which the following is a specification.

My invention relates to certain new and useful improvements in music-scales, and has especial reference to scales for use with a perforation-spacing device for spacing the perforations in sheets of paper to be used in automatic piano-players. Such spacing device is more fully described in my patent for a perforation-spacing device for automatic piano-player tune-sheets, No. 720,075, issued February 10, 1903.

Mechanical piano-players have fingers resting on the piano-keys, which fingers are operated by air-pressure. Corresponding with these fingers are air-valves, from each of which a passage leads to what is designated a "tracker-board" through which these passages are continued, terminating at the upper side of this board in identical openings placed in line with each other and spaced equidistant along the tracker-board. To operate the valves, air is drawn through these openings by a continuously-operated suction-bellows, and to control their action they are normally kept closed by a band of paper of sufficient width to cover the entire board, which paper is drawn over the board during the operation of the player. Perforations are made in this paper corresponding with the note to be played, and when one of these comes over an opening in the tracker-board the corresponding valve operates and depresses the finger to strike that note on the piano. The openings in the tracker-board correspond each with a key on the piano and are in the same order as the keys are, irrespective of whether the key be white or black. These openings then covering one octave on the piano are arranged in the following order C C#, D D#, E F F#, G G#, A A#, B C. Now in my perforation-spacing device wires are strung parallel and spaced the same distance apart as are the holes in the tracker-board of the particular player with which it is to be used and having the same number of spaces as the player has openings. Each of these spaces between wires therefore corresponds to a particular key on the piano, and therefore to a particular note on the written music. If the music is written in the natural scale, these notes follow on the piano-player in the order given, with spaces between where sharps or flats occur. If, however, the music, as shown by the signature on the left, be written in a different key, then some one or more notes are sharped or flatted and the note sharped or flatted occupies one of the previously-open spaces.

It is the object, therefore, of my invention to provide a scale which when set with its signature corresponding with the signature of the written music will indicate to the operator the space in which each written note falls, and will therefore instantly direct him to the proper point at which to cut said note. I carry out this object, as will be more fully hereinafter set out in the drawings, specifications, and claims.

In the drawings, Figure 1 is a perspective view of my scale as applied to my perforation-spacing device. Fig. 2 is a development of one of the scales, showing one octave. Fig. 3 is a cross-section of the scale.

Referring now to the drawings, in which like numerals indicate the same or like parts in all the views, 1 1 are the side frames of my perforation-spacing device.

2 is a block of end-grain wood used as a cutting-block.

3 is the sheet of paper to be perforated, and 4 represents the wires stretched on the frame of the device to divide its width into spaces corresponding each to an opening in the tracker-board.

5 is the scale, which consists of a number of scales, thirteen being shown, these being designated by the numerals 6 to 18, inclusive. These scales are preferably flat and hinged together on a very wide endless link belt and are supported by prism-rollers 19. These rollers have faces 20, which are each of the width of one scale and are preferably of the triangular shape herein shown, so that the scale in use may be inclined to the wires 4, where it rests against them and be therefore more easily read. The rollers 19 are rotatably mounted in end pieces 21, which are preferably connected by a cross-piece 22, which completes a frame for the rollers and scales and serves at the same time to protect the scales from injury and to furnish an indicator for such rotation as may be common to all the scales. The ends 21 are provided with hinges 23, which are fastened to the frame of the spacing device and may therefore be readily raised to adjust the scales.

24 is a spring to return the frame to its place after the scale has been adjusted and to hold the frame down when it is in use.

25 represents handles placed on the projecting ends of the roller-pivots to form a convenient way of setting the scale.

Referring now to Fig. 1, it will be seen that the scale 6 is in position for use, and that this is in the key of C or the natural scale. Following this scale it will be noted that the natural notes A, B, &c., only are marked, and that the blank spaces correspond with the sharps or flats. If it should be so desired, these spaces may be made black and the sharps or flats which they commonly designate be written on them. I prefer, however, to leave these blanks either black or white, the adjoining notes being sufficient to determine positively the note to which they refer. It will be especially noted that the space on piano-player tracker-boards occupied by a sharp or flat, and therefore on this board, is exactly the same as that occupied by a full note, and that the space which any sharp or flat occupies is immediately beside the corresponding note. To sharp a note, therefore, or flat one, it is necessary only to move one space up or down the scale.

Referring now more particularly to Fig. 2, which shows the scale-belt developed or spread out flat, it will be noted that on scale 7 the signature shows the key G or one sharp in which the note $f$ is sharped. Following up the scale (which, as written, begins at A, since the particular piano-player for which the scale is designed comes to G in the second octave of the bass-clef) it will be noted that the notes A, B, &c., occupy the same places they do in the natural scale or key of C, except that F has been moved one space up the scale or, in other words, now occupies the F-sharp space. In like manner scale 8 is for music written in two sharps or the key of D and has F and C sharped. Scale 9 is the key of A or three sharps and has F, C, and G sharped. Scale 10 is in the key of E or four sharps and has F, C, G, and D sharped. Scale 11 is in the key of B or five sharps and has F, C, G, D, and A sharped. Scale 12 is in the key of F or six sharps and has F, C, A, and E sharped. An additional scale of seven sharps might be added, if so desired, though such a key is so little used as to be practically worthless, and is therefore omitted. Scale 13 is in the key of F or one flat, the note B being flatted. Scale 14 is in the key of B♭ or two flats B, and E being flatted. Scale 15 is in the key of E♭ or three flats, B, E, and A being flatted. Scale 16 is in the key of A♭ or four flats B, E, A, and D being flatted. Scale 17 is in the key of D♭ or five flats, B, E, A, D, and G being flatted. Scale 18 is in the key of G♭ or six flats, B, E, A, D, G, and C being flatted. In like manner, as with seven sharps, the key of seven flats may be introduced, if so desired.

In using my invention the music to be reproduced is examined, and the scale with a corresponding signature is brought to the position occupied by the scale 6 in the views—i. e., to a position at the front of the scale-case and with one edge resting on the spacing-wires. When this is done, the punch to cut the desired note is placed between the lines corresponding to the desired note and the paper perforated.

Each scale may be and is preferably marked to indicate middle C, and the bass and treble clefs may also be marked and included by brackets. In addition to this, however, the position of middle C is indicated on the case itself, preferably by an arrow, as shown, and is marked "Middle C," and the bass and trebl clefs are preferably marked on this case only, as is indicated on the drawings, Fig. 1.

Having fully shown and described my invention, what I claim, and desire to secure by Letters Patent in the United States, is—

1. A scale device for a music-perforation spacer, comprising strips, each having imprinted thereon a signature, and a plurality of octaves arranged in the natural scale and spaces between said notes corresponding with the sharps and flats on the piano, except that notes sharped or flatted as indicated by the signature are moved one space up or down the scale as the case may be, embracing the natural scale and ranging from it to six sharps and to six flats substantially as shown and described.

2. A scale device having a frame, prism-shaped rollers rotatably mounted in said frame and a plurality of scales arranged as a belt and mounted on said rollers, substantially as shown and described.

3. In a scale device, the combination with a suitable support, of the scale-frame, hinges connecting said frame with said support, rollers mounted in said frame and a plurality of scales connected in the form of a belt mounted on said rollers, substantially as shown and described.

4. In a scale device the combination with a suitable support, of the scale-frame, hinges connecting said frame and said support, and a spring holding said scale-frame down, of rollers mounted in said scale-frame, and a plurality of scales hinged together in the form of a belt and supported by said rollers, substantially as shown and described.

5. A scale device for a music-perforating device, comprising a plurality of strips, each having imprinted thereon a signature and a plurality of octaves with the notes arranged in the natural scale, and blank spaces between the notes corresponding with the sharps and flats, except that the notes indicated by the signature as sharped or flatted are moved up or down the scale, substantially as shown and described.

6. A scale device having a frame, prism-shaped rollers rotatably mounted in said frame, a plurality of scales arranged as a belt and mounted on said rollers, and handles projecting from said rollers, substantially as shown and described.

7. An indicating device, having a frame, prism-shaped rollers rotatably mounted in said frame, and a plurality of strips arranged as a belt and mounted on said rollers, said strips having each imprinted thereon a signature and a plurality of octaves with the notes arranged in the natural scale, and spaces between the notes corresponding with the sharps and flats on the piano, except that notes sharped or flatted as indicated by the signature are moved one space up or down the scale as the case may be.

8. An indicating device having a plurality of straight pieces hinged together to form a belt, each having imprinted thereon a signature and a plurality of octaves with the notes arranged in the natural scale, and blank spaces between the notes corresponding with the sharps and flats, except that the notes indicated by the signature as sharped or flatted are moved up or down the scale as indicated.

9. A scale device having a frame, rollers rotatably mounted in said frame, a belt mounted on said rollers, and a plurality of scales imprinted on said belt, each of said scales comprising a signature, and a plurality of octaves, with the notes arranged in the natural scale, and blank spaces between the notes corresponding with the sharps and flats, except that the notes indicated by the signature as sharped or flatted are moved up or down the scale, substantially as shown and described.

In testimony whereof I have signed my name to this specification in the presence of two subscribing witnesses.

ALGERNON S. SEVILLE.

Witnesses:
 GEO. E. NEUHARDT,
 J. H. WEATHERFORD.